United States Patent [19]

Kitahama et al.

[11] Patent Number: 5,217,155
[45] Date of Patent: Jun. 8, 1993

[54] METHOD OF CONTINUOUSLY HOT-ROLLING SHEET BARS

[75] Inventors: Masanori Kitahama; Kunio Isobe; Norio Takashima; Toshisada Takechi; Fujio Aoki, all of Chiba, Japan

[73] Assignee: Kawasaki Steel Corporation, Japan

[21] Appl. No.: 927,599

[22] Filed: Aug. 10, 1992

[30] Foreign Application Priority Data

Aug. 16, 1991 [JP] Japan .................................. 3-229754
Aug. 16, 1991 [JP] Japan .................................. 3-229755

[51] Int. Cl.⁵ ........................ B23K 20/00; B23K 20/04
[52] U.S. Cl. ............................. 228/173.3; 228/173.7; 228/265; 228/5.7
[58] Field of Search .................. 228/164, 173.1, 173.3, 228/173.6, 173.7, 265, 5.7, 15.1; 72/203

[56] References Cited

U.S. PATENT DOCUMENTS 5,056,703 10/1991 Sawada et al. ..................... 228/5.7
5,074,457 12/1991 Matsuki et al. ..................... 228/5.7

FOREIGN PATENT DOCUMENTS 2362 1/1978 Japan ................................ 228/173.3
86989 5/1983 Japan ................................ 228/173.3

*Primary Examiner*—Samuel M. Heinrich
*Attorney, Agent, or Firm*—Austin R. Miller

[57] ABSTRACT

A method of continuously hot-rolling sheet bars in which a roughly rolled leading sheet bar and a trailing sheet bar are abutted prior to a hot finish rolling step. Plastic deformation of either or both of the cut rear and front end portions of the leading and trailing sheet bars is applied. End portions are brought into contact with each other due to metal flow, forming a gap portion between the sheet bars. The thickness of the sheet bar around the gap portion is enlarged in comparison to the thickness of the contact portions, and hot finish rolling fills the gap so that the bars are strongly joined over their width.

10 Claims, 11 Drawing Sheets

DISTANCE FROM
JOINT SURFACE (mm)

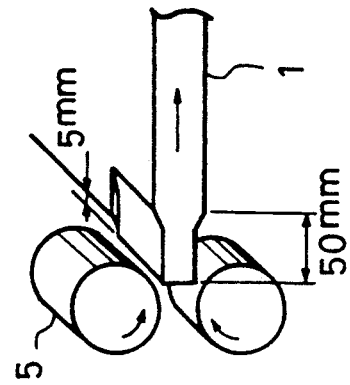
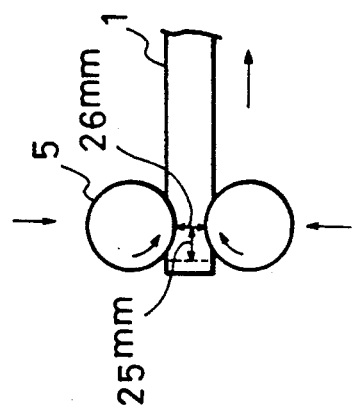
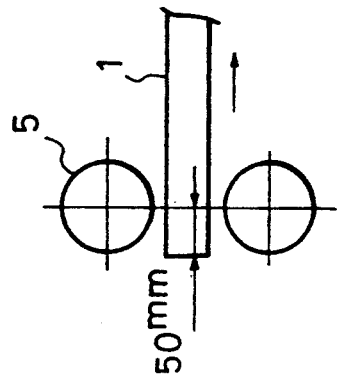
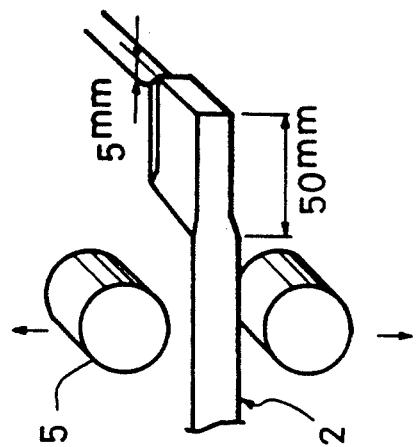
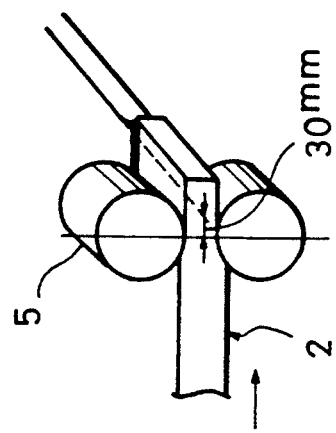
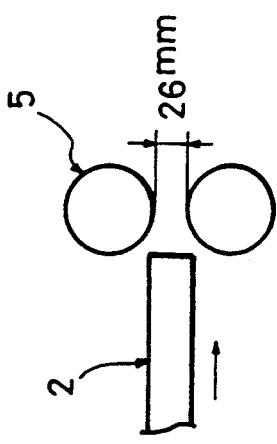

DETAIL OF
UPSET WORK ously hot-rolling a multiplicity of sheet bars such as
METHOD OF CONTINUOUSLY HOT-ROLLING SHEET BARS

BACKGROUND OF THE INVENTION

1. Field of the Invention

The present invention relates to a method of continuously hot-rolling a multiplicity of sheet bars such as steel slabs, billets, blooms or the like, or sheet bars composed of other metals.

2. Related Art Statement

Hitherto, hot-rolling lines have been so arranged that individual sheet bars are roughly rolled, and are then finish hot-rolled one by one to a predetermined thickness. However, such hot-rolling encounters line stoppage problems if the raw steel material to be rolled is defectively caught at the time of the hot finish rolling process. What is even worse, the yield seriously deteriorates in the event of defective shaping of the leading portion or the trailing portion of the steel or other raw material to be rolled.

In order to overcome these problems a rolling method has been employed in which the front end portion and the rear end portion of the steel sheet bars are joined together prior to performing hot finish rolling, and the joined steel plate is continuously supplied to the hot-rolling line (for example, Japanese Patent Laid-Open No. 61-144203).

As disclosed in Japanese Patent Laid-Open No. 61-144203 the rear end portion of a leading sheet bar is conveyed forward and the front end portion of the trailing sheet bar which is conveyed behind it are abutted completely against each other, their respective widthwise edge portions are joined up, and the joined sheet bars are rolled while maintaining this configuration.

However, too much time is taken to complete joining with sufficient strength; accordingly, the length of the sheet bar line becomes excessive.

In order to overcome the problem, the inventors of the present invention have disclosed a joining method in International Publication No. WO92/02313, No. WO92/02314 and No. WO92/02315, the joining method being so conducted that the rear end portion of the leading sheet bar and the front end portion of the trailing sheet bar are partially cut so as to bring at least the two widthwise edge portions of the two sheet bars into contact with each other, a gap is created between the two sheet bars, and the contact portions are locally heated and pressed. As a result, the joining work can be more quickly and easily performed.

However, the aforesaid method is subject to further improvement because breakage and separation where the sheet bars are joined up cannot be completely prevented due to a fact that the gap between the two sheet bars cannot be completely eliminated in the hot-rolling process.

SUMMARY OF THE INVENTION

An object of the present invention is to provide a novel hot-rolling method capable of advantageously overcoming the aforesaid problems, easily and quickly joining up steel bars before the inlet of a hot finish rolling mill, and further strongly joining up the sheet bars as the hot finish rolling proceeds.

BRIEF DESCRIPTION OF THE DRAWINGS

FIGS. 9(a) through 9(c) are perspective views which illustrate steps taken as the rear end portion of the leading sheet bar is pressed according to one embodiment of the present invention;

FIGS. 10(a) through 10(c) are perspective views which illustrate steps taken as the front end portion of the trailing sheet bar is pressed according to one embodiment of the present invention;

DETAILED DESCRIPTION OF PREFERRED EMBODIMENTS

Figure 1:
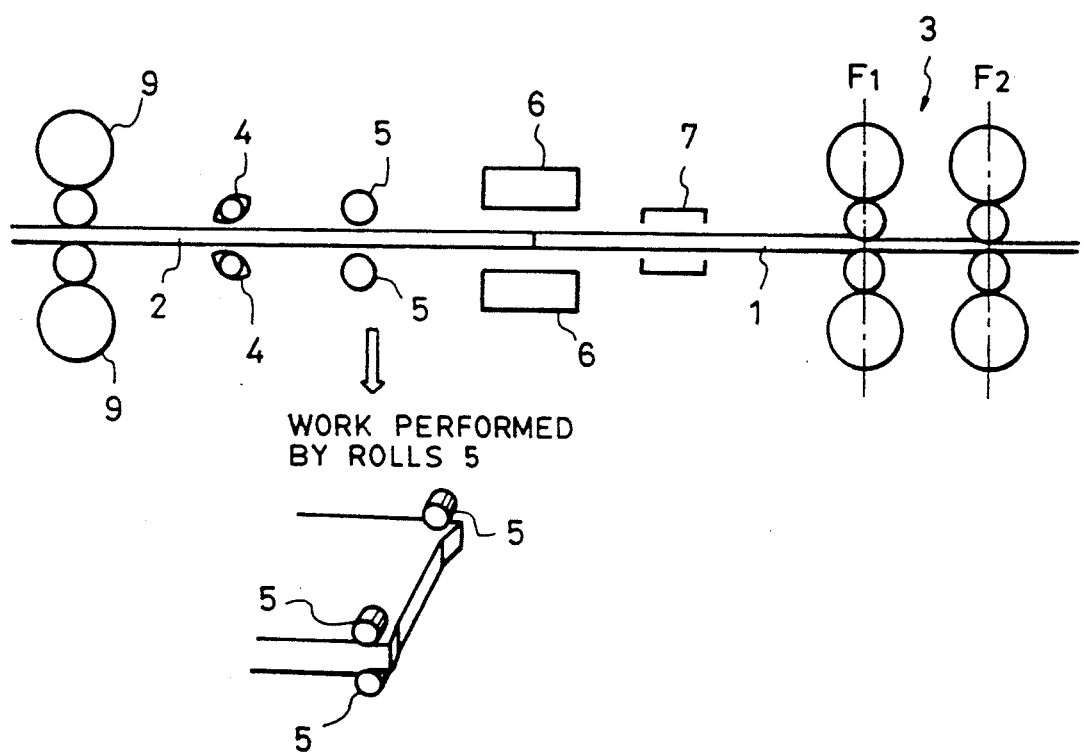
FIG. 1 schematically illustrates a hot-rolling line embodying features of one form of the present invention.

Turning now to the preferred embodiments of the present invention selected for illustration in the drawings, specific terms will be used in the interest of clarity, but neither the drawings nor the following description are intended to define or to limit the scope of the invention, which is defined in the claims.

FIG. 1 schematically illustrates a hot-rolling line. Reference numeral 1 represents a leading sheet bar which has passed through rough rolling mills, and 2 represents a trailing sheet bar following the leading sheet bar 1. Reference numeral 3 represents a hot finish rolling mill having rolling mill stands F1, F2, . . . , arranged in a tandem manner; 4 represents a cutting device for cutting the front end portion and the rear end portion of the sheet bars, and 5 represents pressing rolls for thickness reduction of at least the two widthwise directional ends, or corners, of each of each successive rear end portion of the cut leading sheet bar 1 and/or the front end portion of the trailing sheet bar 2. Reference numeral 6 represents a thermal joining device for thermally joining the sheet bars 1 and 2, and 7 represents a scale breaker for removing scale generated on the surfaces of each of the sheet bars 1 and 2 prior to hot finish rolling.

Figure 2A:
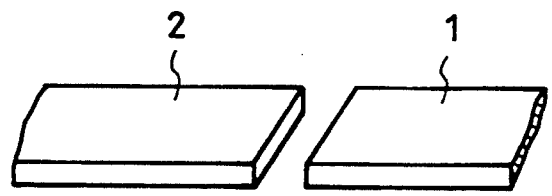
FIGS. 2(a) through 2(e) are perspective views which illustrate a method of joining a leading sheet bar and a trailing sheet bar according to the present invention.
Figure 2B:
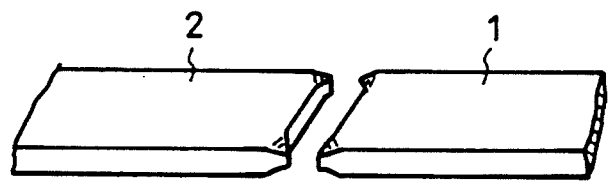

When a sheet bar is hot-rolled in the rolling mill 3 by the method according to this embodiment of the present invention, the rear end portion of the leading sheet bar 1 and the front end potion of the trailing sheet bar 2 are respectively cut so as to be formed into shapes of the type shown in FIG. 2(a). In this arrangement no gap is present between the two sheet bars 1 and 2 although the leading sheet bar 1 and the trailing sheet bar 2 are abutted against each other. Thickness reduction is applied to at least either the rear end portion of the leading sheet bar 1 or the front end portion of the trailing sheet bar 2 at least at their corners, as indicated in FIG. 2(b).

The sheet bar portions on which thickness reduction is effected include at least the two widthwise directional ends, or corners, in order to enable the positions adjacent to the widthwise directional ends to be heated and joined up. Otherwise, the sheet bars can be easily broken apart during finish rolling.

Figure 2C:
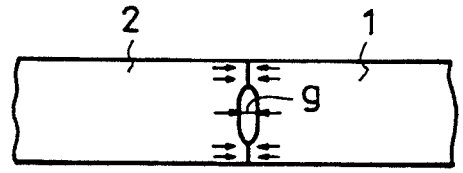

As a result, the metal flow taking place at the time of thickness reduction will cause at least the two end portions to be brought into contact with each other and will cause a gap such as (g) of FIG. 2(c) to be formed between the leading sheet bar 1 and the trailing sheet bar 2.

A combination of heating by the thermal joining device 6 and pressing by adjusting the conveyance speed of the sheet bars 1 and 2 generates compressive stress at the end portions of the leading sheet bar 1 and the trailing sheet bar 2 as shown in FIG. 2(c) so that the two sheet bars 1 and 2 are brought into contact with each other and joined up. Then, the joined sheet bars 1 and 2 are sent to the hot finish rolling mill 3 of FIG. 1.

Figure 2D:
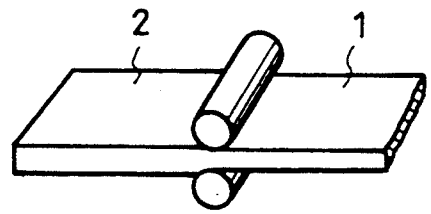
Figure 2E:
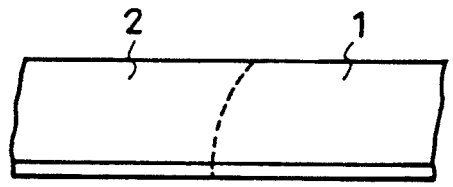

Since the regions joined up are only regions adjacent to the corners of each of the sheet bars 1 and 2 as shown in FIG. 2(c), they can be joined up in an extremely short time while maintaining a gap (g) between the joined portions. The aforesaid gap (g) is formed due to the residual gap created by the metal thickness reduction at the corners. When rolling is performed as shown in FIG. 2(d) further metal flow fills up the gap (g) since the portion around the gap is relatively thick in comparison to the corners. Hence, the ends of sheet bars 1 and 2 are strongly joined over the entire widthwise surface as shown in FIG. 2(e). Therefore, even if the material to be rolled is later subjected to tension for the purpose of adjusting its dimension in hot finish rolling, the two sheet bars cannot be easily broken away or separated from each other.

Ordinary hot-rolling is so arranged that the end portion of the sheet bar, which has been roughly rolled, is cut by using a curved blade having one of various curvatures designed to be adaptable to the cross-sectional shape and thickness of the sheet bar in order to prevent generation of unsteady portions at the leading end portion of the sheet bar on which the hot finish work has been effected.

Figure 3A:
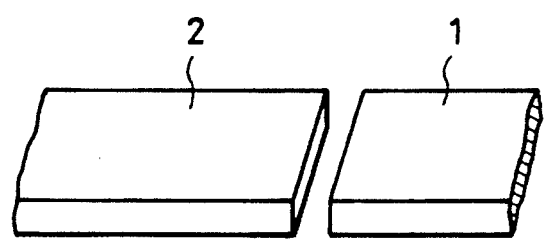
FIGS. 3(a) through 3(c) are perspective views which illustrate various shapes of cut portions of leading and trailing sheet bars according to the present invention.
Figure 3B:
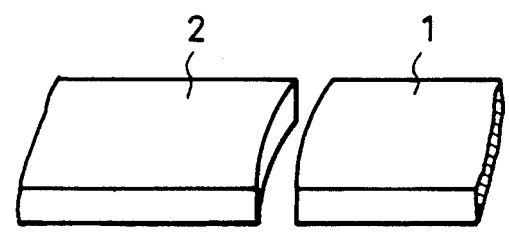
Figure 3C:
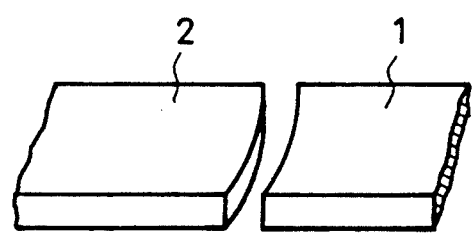

In the present invention the cut portion at the end of each of the sheet bars may be formed into various shapes such as flat shapes as shown in FIG. 3(a), or combinations of convex and concave portions as shown in FIGS. 3(b) and 3(c). Therefore, the present invention can be applied to any sheet bars which have been cut in ordinary hot-rolling processes.

Various cutting means may be used for forming the aforesaid shapes, including shearing means, gas cutting means or laser fusing means, for example.

It is preferable that, for reducing thickness, a device having pressing rolls 5 as shown in FIG. 1 may be used.

The pressing rolls 5 for use in the present invention are, as shown in FIG. 1, disposed in such a manner that a pair of the pressing rolls is disposed at each of the sheet bar corners, the roll having a body length which is longer than 0.1 times the width of the material having the maximum width. Furthermore, the pressing roll device has a mechanism for shifting its position widthwise to suit the width of the sheet bar, and includes a pressing mechanism for applying a predetermined thickness reduction, and a synchronizing mechanism for causing the left and the right pressing rolls to press the sheet bar in synchronization with each other.

An example of a specific method of thickness reduction, by using the aforesaid device, will now be described in detail. The invention may use an anvil for the forging step.

According to the present invention, the two sheet bars 1 and 2 are caused to abut against each other as in FIG. 1. The heating and pressing steps may be performed by any of the following methods:

(i) heating is stopped when the temperature of the portions to be joined has been raised to an enabling level and pressing is then performed.

(ii) when the temperature of the portions to be joined has been raised to an enabling level, pressing is started while continuing to apply heat. (However, the temperature should not be raised above the melting point of the sheet bars.)

(iii) the two sheet bars are pressed at the beginning of the process and simultaneously the contact portions (corner portions) are heated.

(iv) pressing is performed to a predetermined joining allowance. (Preferably the joining allowance at each corner of the sheet bar is equal to or greater than about 1/10 of the width of the sheet bar.)

The methods (iii) and (iv) are particularly effective because the sheet bars can be well joined by simple pressing since the sheet bars may be heated to a temperature of about 1000° to 1100° C. at an early stage of the hot finish rolling process, and therefore heating performed simultaneously or immediately after the commencement of the pressing work will enhance joining so that the time taken to complete the joining can be shortened and the quantity of heating power can be reduced.

The type of heating means according to the present invention is not limited particularly; any means may be selected including a gas burner, electric heating means or induction heating means. In particular, it is significantly advantageous to employ induction heating arranged as shown in FIG. 4 so that an alternating field is caused to pass through the thickness of the sheet bar before it is applied (hereinafter such a method is called the "transverse method").

Figure 4:
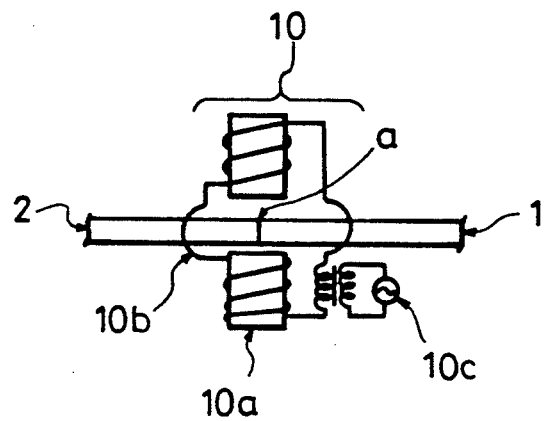
FIG. 4 schematically illustrates a transverse type induction heating device which can be preferably used in the present invention.

Referring further to FIG. 4, reference numeral 10 represents an alternating field generating coil for generating an alternating field which passes through the sheet bars 1 and 2 in the direction of their thicknesses. The coil 10 is, as shown, composed of a pair of cores 10a which are arranged vertically above and below the sheet bar 1, a coil 10b continuously wound around the cores 10a, and a power source 10c.

Figure 5A:
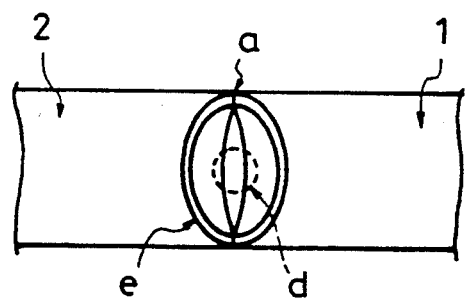
FIG. 5(a) is a plan view which schematically illustrates the flow of an eddy current induced by an induction heating device as shown in FIG. 4 and according to the present invention.
Figure 5B:
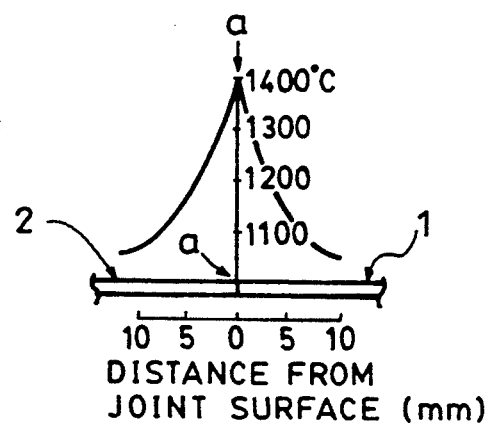
FIG. 5(b) illustrates an exemplary temperature distribution at the abutment region of the sheet bars.

When an alternating field (d) (FIG. 5(a)) is applied to the central region of an abutment portion (a) between the leading sheet bar 1 and the trailing sheet bar 2 by the transverse method arranged as shown in FIG. 4, an eddy current (e) as shown in FIG. 5(a) is generated and the contact regions at the two ends of the abutment portion are mainly heated because of high electrical resistance of contact regions as shown in FIG. 5(b). Therefore, induction heating is significantly advantageous where it is important to heat two widthwise directional regions of each of the sheet bars. In a case where the contact regions are located at a central portion and/or other sheet bar portions as well as the corners, a selected number of alternating field generating coils may be disposed at predetermined positions so as to heat the desired contact regions with priority.

Although the joining process can be satisfactorily performed at a temperature of about 1250° C. or higher, the end portions of the sheet bars might be caused to melt if the heating temperature is too high. Therefore, it is preferable to control the temperature of heating to about 1450° C. or lower.

Figure 6:
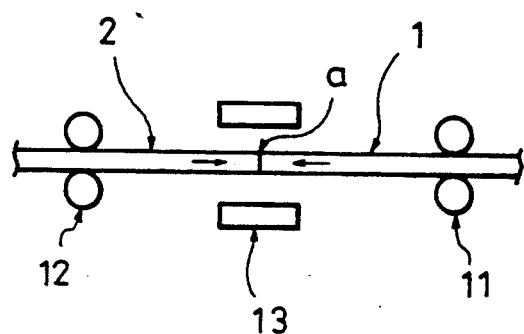
FIG. 6 schematically illustrates an example of a heating and pressing device for heating and pressing sheet bars according to the present invention.

The pressing step can be easily performed by using pinch rolls 11 and 12 (FIG. 6) disposed to interpose the abutment portion (a) at the end portions of the sheet bars. A sufficient pressing force is about 3 to 5 kg/mm². Reference numeral 13 of FIG. 6 represents a heating device.

In performing the aforesaid heating and pressing work according to this embodiment, sheet bar deformation starts from the two corner portions or end portions, which are the hottest regions on the sheet bar. Therefore the joined regions are gradually extended from the two ends or corners toward the central portion so that the joining force is effectively strengthened.

It is preferable that the joining allowance W at each of the corners be about 0.1 times or more of the sheet bar width B (FIG. 7) at each end. Therefore the total sum of the two may be about 0.2 times or more of the sheet bar width. If the total sum of the joining allowances is smaller than about 0.2 times the width of the sheet bar, there is a danger that the leading and trailing sheet bars may be broken and separated from each other with ensuing hot finish rolling.

Figure 7:
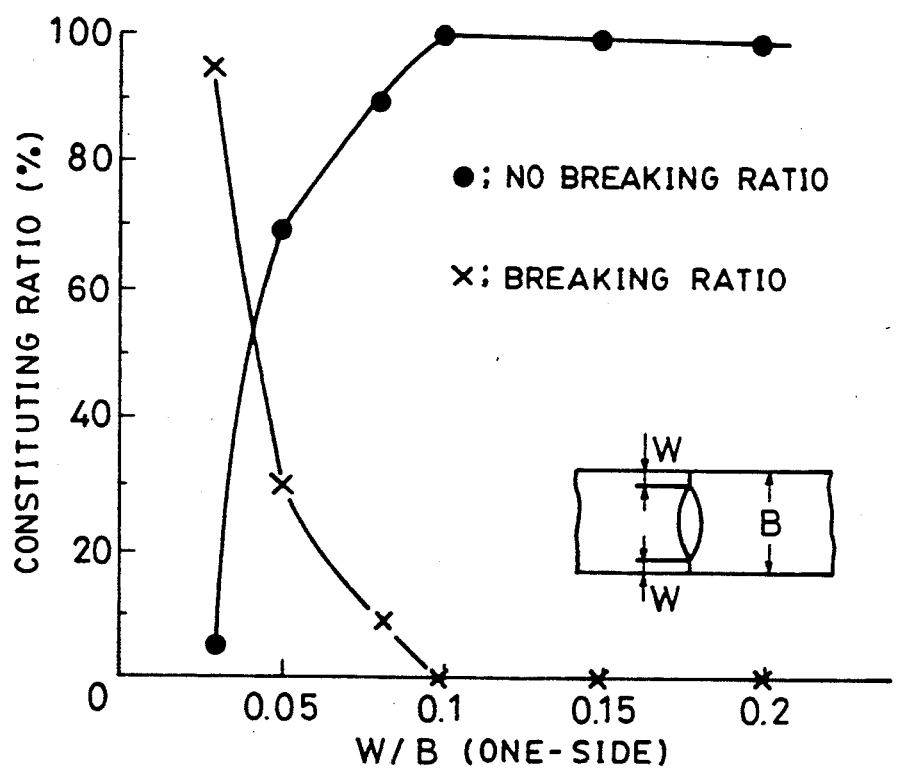
FIG. 7 is a graph which illustrates a typical relationship between the joining area of the sheet bars and the occurrence of breakage in the hot finish rolling process.

FIG. 7 is a graph which illustrates a typical relationship between joining allowance and occurrence of breakage at finish rolling.

As can be seen from FIG. 7, breakage and the separation of the two ends can be completely prevented in the ensuing hot finish rolling process by making the joining allowance W at each of the two ends about 0.1 or more of the sheet bar width B.

The following examples are intended to be illustrative but not to limit the scope or spirit of the invention, which is defined in the appended claims.

EXAMPLE 1

Figure 8:
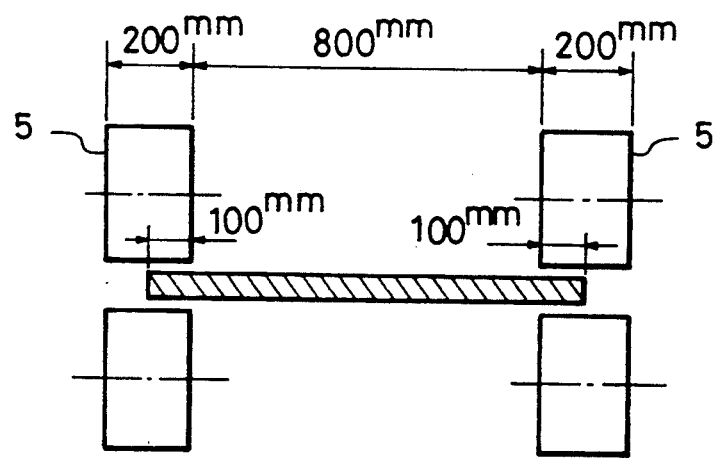
FIG. 8 illustrates an example of positional relationships between the pressing rolls and the sheet bar in an embodiment according to the present invention.

A hot-rolling line arranged as shown in FIG. 1 was used to perform continuous hot-rolling as follows: Serving as the leading and trailing sheet bars, sheet bars having a width B of 1000 mm and a thickness of 30 mm were used. Furthermore, two pairs of pressing rolls 5 each having a diameter of 320 mm and a width of 200 mm were disposed as shown in FIG. 8. The inner distance between the two end surfaces of the pressing rolls 5 was accordingly 800 mm (FIG. 8). Furthermore, the inner end portion of the pressing roll 5 was located at a position 100 mm inside of each corner of the sheet bar.

First, the rear end portion of the leading sheet bar 1 and the front end portion of the trailing sheet bar 2 were cut so as to be formed into flat shapes as shown in FIG. 3(a).

The leading sheet bar 1 was moved to a point at which the rear end portion of the leading sheet bar 1 trailed 50 mm behind the axis between the centers of the pressing rolls 5 (see FIG. 9(a)). In this position, pressure was applied until the distance between the two pressing rolls 5 became 26 mm. The distance between the pressing rolls 5 became 26 mm by the time the rolling had moved the leading sheet bar 1 by about 25 mm from the start of rolling (see FIG. 9(b)). Rolling was then similarly applied to the rear end portion of the leading sheet bar 1 in the aforesaid manner.

As a result the portions of the two widthwise directional ends in the rear end portion of the leading sheet bar having a width of 100 mm were pressed along a length of 50 mm in the rolling direction and therefore the aforesaid portions were caused to protrude lengthwise by 5 mm from the central portion (see FIG. 9(c)).

Thereafter the trailing sheet bar 2 was pressed by rolls 5 in a manner shown in FIGS. 10(a) through 10(c). In this case, the distance between the press rolls 5 had previously been reduced to 26 mm (see FIG. 10(a)). Rolling was performed until the corner portion of the trailing sheet bar 2 protruded from the central area by 30 mm (see FIG. 10(b)). Pressure was removed from the rolls 5. As a result, the front end portion of the trailing sheet bar 2 was pressed with its ends each having a width of 100 mm at the corners along a length of 50 mm in the rolling direction, so that the resulting pressed corner portions protruded ahead of the sheet bar central portion by 5 mm (see FIG. 10(c)).

Figure 11:
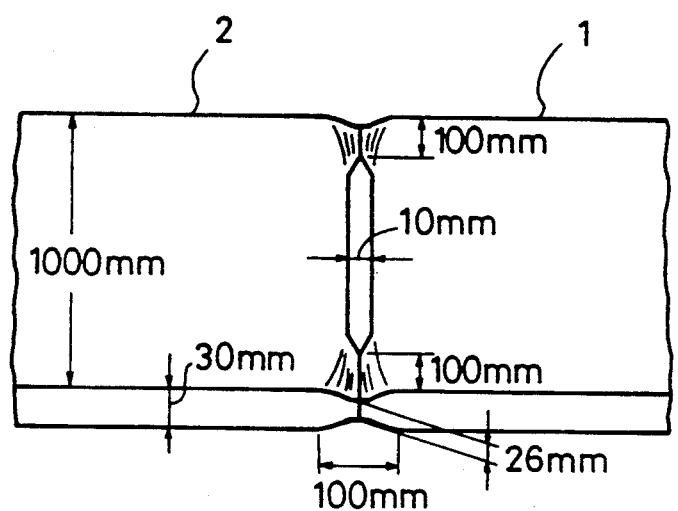
FIG. 11 is a perspective view which illustrates joining of the leading sheet bar and the trailing sheet bar wherein they abut against each other in an embodiment according to the present invention.

Thus, the two corners of each of the abutting sheet bars 1 and 2 were reduced in thickness, so that a gap of 10 mm beyond the central portions was formed as shown in FIG. 11.

Figure 12:
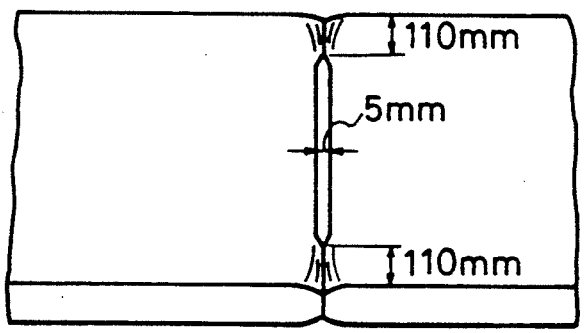
FIG. 12 is a perspective view which illustrates a juncture of the leading sheet bar and the trailing sheet bar after they have been heated and pressed in an embodiment according to the present invention.

The leading sheet bar 1 and the trailing sheet bar 2 then moved to the pressing device 6 (FIG. 6), and the pinch rolls 11 and 12 shown in FIG. 6 were used to abut the two sheet bars 1 and 2 against each other. Then, the two sheet bars 1 and 2 were pressed with a force of 3 kgf/mm² by the pinch rolls 11 and 12 while heating them by using a solenoid coil type induction coil (supplied electric power: 4000 kW, frequency: 500 Hz) shown in FIG. 4. Heating and pressing were stopped when the gap at the center of the bar ends became 5 mm as shown in FIG. 12. Then, hot finish rolling was effected on the sheet bars and a hot-rolled sheet having a thickness of 3 mm was manufactured.

As a result it was confirmed that the joined portion between the sheet bars 1 and 2 was not broken that the sheet bars were not separated from each other during the rolling process. They were easily rolled in a stable manner. Furthermore, the central gap in the joined end portion was readily completely eliminated by hot finish rolling and excellent joining strength was obtained.

It was advantageous to dimension the initial central gap at about 10 mm. The gap is desirably selected on the basis of the amount of pressing needed to obtain satisfactory joining. Therefore the gap may vary depending upon the type of the steel, the material and the temperature applied. It is preferable that the gap be substantially about 0.1 times or more the thickness of the sheet bar. According to this embodiment, the thickness reduction work was so performed that the initial gap of about 10 mm could be obtained controlling the gap that remains after the pressing work to about 5 mm in order to obtain a compression of about 5 mm.

It was beneficial to control the final gap to a value of about 5 mm. Although it is preferable to minimize the size of the gap realized after the heating and pressing work has been completed, to perform the ensuing finish rolling work, a predetermined heating temperature cannot always be obtained when heating is performed by the transverse method because, if a contact region is generated in a portion other than the two ends, an induced electric current is generated in the contact region. Therefore, it is preferable to minimize the size of the gap at the central portion realized after the heating and pressing work has been completed, but that the end portions except for the two ends do not contact. From the viewpoint of practical use, it is preferable that the gap be controlled to be about 5 mm in size.

Finish rolling work was subsequently performed, and a hot-rolled sheet having a thickness of 3 mm was produced.

As a result it was confirmed that the joined portion between the sheet bars did not break and the bars did not separate from each other during the rolling process, and that they were stably rolled. Furthermore, the aforesaid gap in the joined portion was easily completely eliminated by hot finish rolling and an excellent joining strength was obtained.

On the other hand, in a case where the sheet bar having a plane shape which was the same as that shown in FIG. 4 was obtained by cutting with a cutter (therefore the two end portions were not thinned), joining was performed under similar conditions and hot finish rolling was performed, the gap still remained after hot finish rolling had been completed and a critical problem sometimes arose since the joined portion was broken and the bars separated from each other during hot finish rolling.

Another important embodiment of the invention will now be specifically described.

Figure 13:
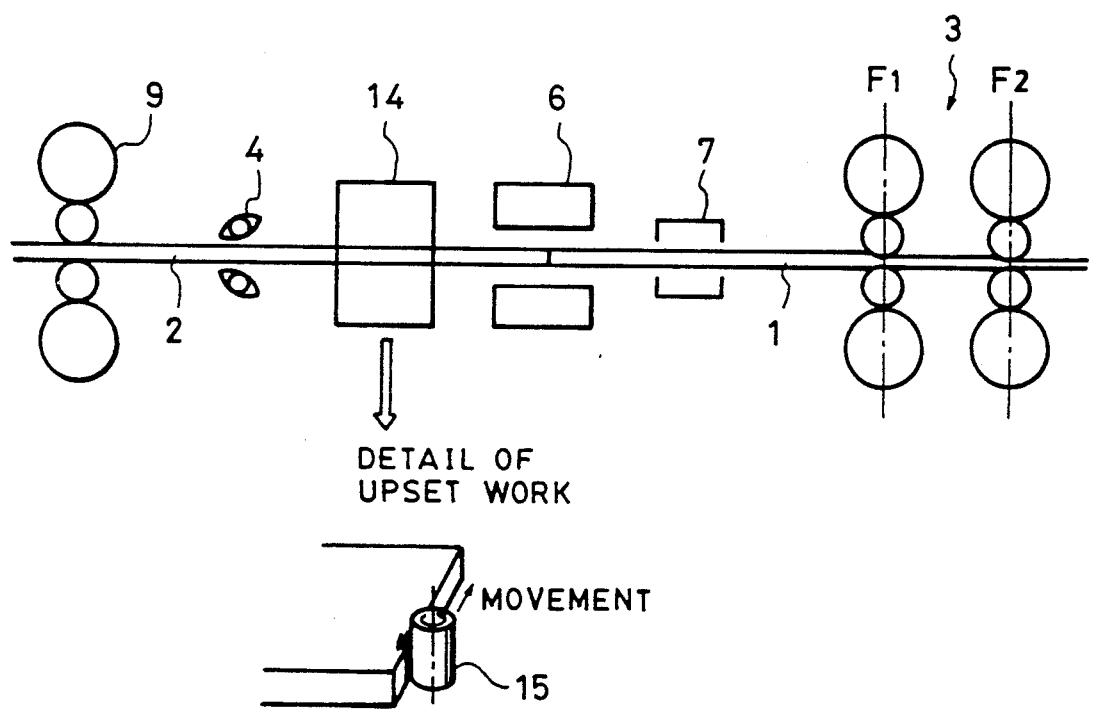
FIG. 13 schematically illustrates a hot-rolling facility to which another embodiment of the present invention is applied.

FIG. 13 of the drawings schematically illustrates a further embodiment of the present invention. As in FIG. 1, reference numeral 1 represents a leading sheet bar which has passed through a rough rolling mill, and 2 represents a trailing sheet bar. As in FIG. 1, 3 represents a hot finish rolling mill having rolling mill stands F1, F2, ..., arranged in a tandem manner, and 4 represents a cutting device for cutting the front and rear end portions of the sheet bars. Reference numeral 14 in FIG. 13 represents a working device for upsetting metal in the region of the rear end portion of the cut leading sheet bar 1 and/or the front end portion of the cut trailing sheet bar 2, except for at least the corner portions. The upsetting device 14 includes pressing rolls 15 (FIG. 13) which rotate about a vertical axis and are capable of pressing and upsetting the end portions of the sheet bars. Reference numeral 6 represents a thermal joining device for thermally joining the upset sheet bars, and 7 represents a scale breaker for removing scale generated on the surface of each of the sheet bars 1 and 2 prior to hot finish rolling.

Figure 14A:
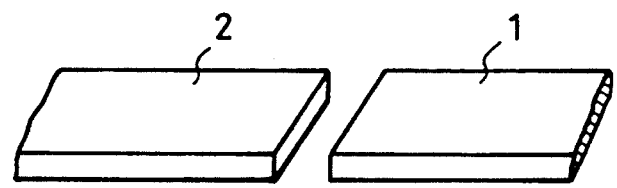
FIG. 14(a) through 14(e) are perspective views which illustrate a method of joining the leading sheet bar and the trailing sheet bar according to another embodiment of the present invention.

When sheet bars are to be hot-rolled by the method according to the present invention, the rear end portion of the leading sheet bar 1 and the front end portion of the trailing sheet bar 2 are preliminarily cut into the shapes shown in FIG. 14(a). In this configuration no gap is present between the two sheet bars 1 and 2 although the leading sheet bar 1 and the trailing sheet bar 2 are caused to abut against each other. Then, upset work is effected on at least either of the rear end portion of the leading sheet bar 1 or the front end portion of the trailing sheet bar 2 in a region not including the two widthwise directional ends (corners).

Figure 14B:
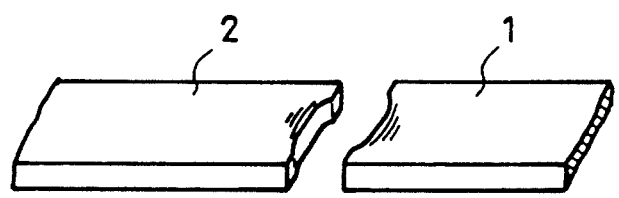

As a result the thicknesses of the upset portions are increased due to the upset work as shown in FIG. 14(b) (according to the FIG. 14(b) embodiment the upset work is effected on both the rear end portion of the leading sheet bar 1 and the front end portion of the trailing sheet bar 2), and a gap is created in the portion, on which the upset work has been effected, when the leading sheet bar and the trailing sheet bar are caused to abut against each other.

Figure 14C:
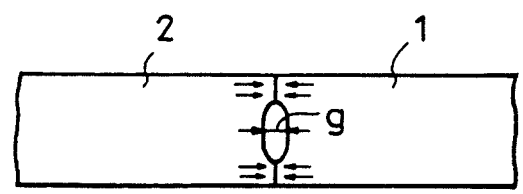

A combination of heating effected by the thermal joining device 6 and pressing performed by adjusting the relative speeds of conveyance of the sheet bars 1 and 2 generates compressive stress in a region adjacent to the two corner portions of the leading sheet bar 1 and the trailing sheet bar 2 as shown in FIG. 14(c) so that the two sheet bars 1 and 2 are brought into contact with each other and joined. Then the joined sheet bars 1 and 2 are sent to the hot finish rolling mill 3 and are subjected to hot finish rolling.

Figure 14D:
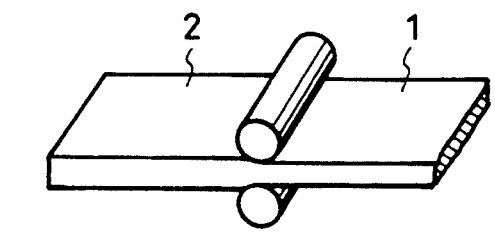
Figure 14E:
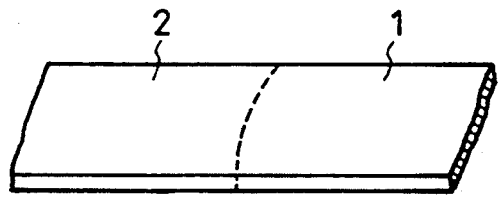

Since the regions joined on the inlet side of the hot finish rolling mill 3 are only regions adjacent to the corners of each of the sheet bars 1 and 2 as shown in FIG. 14(c), they can be joined in an extremely short time while having a gap (g). The aforesaid gap (g) is formed due to the residual gap created by the upset work performed prior to abutment joining. Around the gap (g) the thickness of the upset portion has been increased due to metal deformation caused by the upset work. When rolling is performed as shown in FIG. 14(d) by the hot finish rolling mill 3, the gap is closed in by metal flow since the portions in which the gap is present are relatively thick at the front end portion of the sheet bar 1 and the rear end portion of the trailing sheet bar 2. Hence, the end surfaces of each of the sheet bars 1 and 2 can be strongly joined over the entire abutting surface as shown in FIG. 14(e). Therefore, even if the material to be rolled is subjected to tension for the purpose of adjusting dimension in finish rolling, the two sheet bars cannot be easily broken or separated from each other.

As for the shapes of each of the cut portions at the ends of the sheet bar, they may be formed into various shapes such as flat shapes as shown in FIG. 3(a), or combinations of a convex portion and a concave portion as shown in FIGS. 3(b) and 3(c). As cutting means for forming the aforesaid shapes, shearing means, gas cutting means or laser fusing means may be employed.

For performing the upset work, a device may be used having the pressing rolls 15 as shown in FIG. 13, or an anvil for the forging work may be employed. The widthwise position to which the upset work is applied may be determined to be any portion except at least the two corners of each sheet bar.

As before, the two sheet bars are caused to abut against each other, and heating and pressing are effected. The heating and pressing steps may be performed by any of the following methods:

(i) heating is stopped when the temperature of the portions to be joined has been raised, and then followed by pressing.

(ii) when the temperature of the portions to be joined has been raised to a level at which joining can be enabled, pressing is started while continuing heating (however, the temperature is not raised to a level higher than the melting temperature).

(iii) the two sheet bars are pressed from the beginning and simultaneously the contact portions are heated.

(iv) pressing is performed to a predetermined joining allowance (preferably, the joining allowance at each two ends of the sheet bar is about 1/10 or more of the width of the sheet bar).

It is preferable that the joining allowance W at each of the widthwise spaced ends (corners) be about 0.1 times or more of the sheet bar width B at each end and therefore the total sum of the same may be about 0.2 times or more.

Furthermore, heating means similar to those employed in the embodiments previously described may be employed.

EXAMPLE 2

A hot-rolling facility arranged as shown in FIG. 13 was used to perform continuous hot-rolling as follows: as the leading and trailing sheet bars, low carbon steel sheet bars having a width of 1000 mm and a thickness of 30 mm were used.

Figure 15:
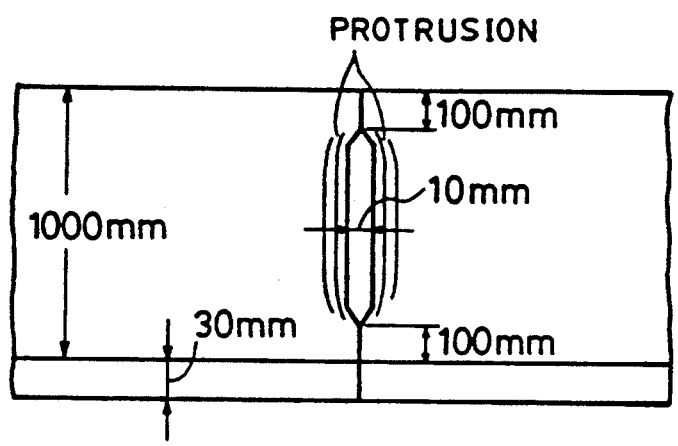
FIG. 15 is a perspective view which illustrates a typical relationship where the leading sheet bar and the trailing sheet bar are joined together in an embodiment according to the present invention.
Figure 16:
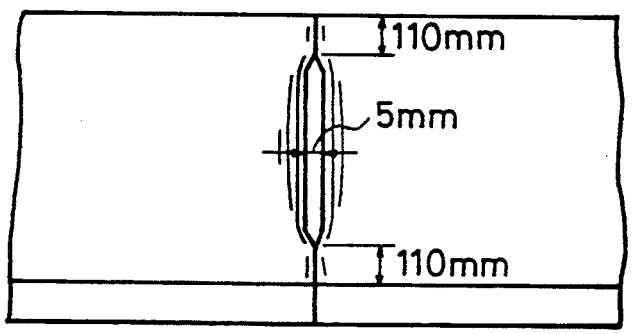
FIG. 16 is a perspective view which illustrates a condition where the leading sheet bar and the trailing sheet bar are joined up after they have been heated and pressed in an embodiment according to the present invention.
Figure 17:
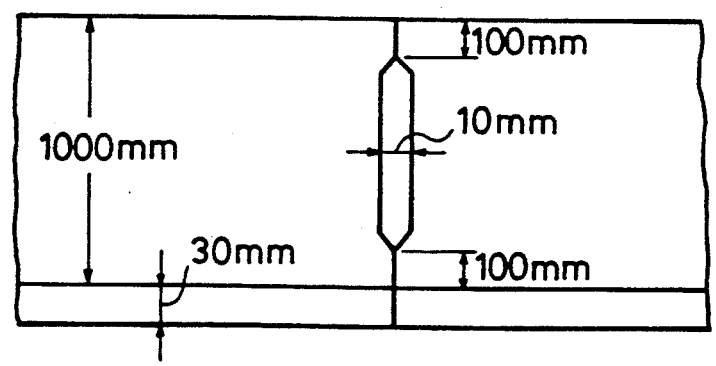
FIG. 17 illustrates a condition where the leading sheet bar and the trailing sheet bar are abutted using conventional technology.

First, the rear end portion of the leading sheet bar and the front end portion of the trailing sheet bar were cut so as to be formed into flat shapes as shown in FIG. 14(a). Upset work was effected on the central region except for corner portions of 100 mm of each sheet bar in order to create a gap having a size of 10 mm. The space bars were caused to abut against each other as shown in FIG. 15. Heating and pressing were performed, narrowing the gap so that a shape as shown in FIG. 16 was formed.

The heating and pressing conditions were the same as those according to Example 1.

Then, a hot-rolled sheet having a thickness of 3 mm was manufactured by finish rolling.

As a result, it was confirmed that the joined portion between the sheet bars was not broken or separated during the rolling process and that they were stably rolled. Furthermore, the aforesaid 5 mm gap in the joined portion of FIG. 16 was completely eliminated after hot finish rolling had been completed and excellent joining strength was obtained.

As described above, according to the present invention, the leading sheet bar and the trailing sheet bar are partially joined ahead of the hot finish rolls and the end portions of the sheet bars but not the intervening portions are brought into contact with each other and joined as described. Continuous hot-rolling at excellent productivity rates, while eliminating the danger of breakage or separation of the joined portion, is effectively realized.

It will be appreciated that the rolling method of this invention may be modified in many different ways. While FIGS. 11 and 12 show joined metal portions at the corners of the abutting edges of the sheet bars, with a gap in between, the bars may be configured to abut at one or more inner portions, with gaps provided at the corners. As a still further modification, more than one gap portion may be provided, and these may be arranged in various configurations. When a gap is at a corner or not surrounded by metal, it should preferably be heated by a burner rather than by induction heating.

Other modifications may be made including substitution of equivalents, reversals of parts or method steps, and the use of certain features independently of others, all without departing from the spirit and scope of the invention as defined in the appended claims.

What is claimed is:

1. In a method of continuously hot-rolling sheet bars in such a manner that a leading sheet bar and a trailing sheet bar are joined up prior to a hot finish rolling step, and then said joined sheet bars are continuously hot-rolled, the method of continuously hot-rolling sheet bars which comprises:

effecting a plastic deformation on either or both of the rear end portion of said leading sheet bar, or the front end portion of said trailing sheet bar;

causing said rear end portion of said leading sheet bar and said front end portion of said trailing sheet bar to abut against each other;

bringing at least the two widthwise directional ends of said rear end portion and said front end portion into contact with each other due to a metal flow generated due to said plastic work;

forming, in a region other than said two widthwise directional ends, a gap portion in which said rear end portion of said leading sheet bar and said front end portion of said trailing sheet bar are spaced apart from each other;

relatively enlarging the thickness of said sheet bar around said gap portion relative to the thicknesses of said widthwise directional ends;

joining said two sheet bars by heating and pressing on said contact region; and hot finish rolling said sheet bars to bring said end portions of said sheet bars into contact with each other and to join them over the widthwise directional surface.

2. In a method of continuously hot-rolling sheet bars wherein a leading sheet bar, which has passed through a rough rolling process, and a trailing sheet bar conveyed in succession to said leading sheet bar are joined on the inlet side of a hot finish rolling step, and wherein said joined sheet bars are subsequently supplied to said hot finish rolling step so that said joined sheet bars are continuously hot-rolled, the method of continuously hot-rolling sheet bars which comprises the steps of:

cutting said leading or trailing sheet bars;

effecting thickness reduction on either or both of the rear end portion of said leading sheet bar, on which cutting has been effected, or the front end portion of said trailing sheet bar on which cutting has been effected;

causing metal flow by applying thickness reduction work to said rear end portion of said leading sheet bars and/or said front end portion of said trailing sheet bar;

causing said sheets to abut against each other and to bring at least the two widthwise portions of said rear end portion and said front end portion into contact with each other;

joining up said contact region by heating and pressing on said contact region;

bringing said end portions of said sheet bars into contact with each other; and joining them up over the widthwise directional entire surface by hot finish rolling.

3. In a method of continuously hot-rolling sheet bars wherein a leading sheet bar, which has passed through a rough rolling process, and a trailing sheet bar conveyed after said leading sheet bar are joined up on the inlet side of a finish rolling facility, and then said joined sheet bars are supplied to a finish rolling facility so that said joined sheets are continuously hot-rolled, the steps comprising:

effecting upset work on a region other than corners of either or both of the rear end portion of said leading sheet bar on which cutting work has been effected, and the front end portion of said trailing sheet bar on which said cutting work has been effected;

providing metal flow by said upset work;

causing said rear end portion of said leading sheet bar and said front end portion of said trailing sheet bar to abut against each other;

bringing together at least the two corners of said rear end portion and said front end portion into contact with each other to form spaced-apart contact regions;

joining up said two sheet bars by heating and pressing said contact regions; and hot finishing said contact regions to join said bars over the entire widthwise surface thereof.

4. In a method of joining successive abutting metal sheet bars suitable for finish hot rolling without substantial danger of subsequent breakage or separation, the steps which comprise:

(a) providing on abutting edges of said sheet bars projecting portion which projects toward the other of said sheet bars to form a contact area;

(b) providing adjacent said contact area at least one gap area in which said sheet bars are out of contact with each other;

(c) working the metal of at least one of said sheet bar edges to provide an area of greater metal thickness disposed around said gap area than the metal thickness at said contact area; and (d) filling said gap area by displacing metal from said area of greater metal thickness.

5. The method defined in claim 4 wherein spaced-apart contact areas are located at opposed corners of said sheet bars.

6. The method defined in claim 4 wherein said step (c) comprises compressing the metal thickness at said contact areas.

7. The method defined in claim 4 wherein said step (c) comprises upsetting metal in an area spaced between said projecting portions to form a gap area of increased metal thickness.

8. The method defined in claim 4 wherein step (d) is accompanied by heating and compressing the abutting faces until said gap area is filled.

9. The method defined in claim 4 wherein said gap area is located between spaced contact areas.

10. The method defined in claim 4 wherein at least one gap area is located at a corner of the abutting edges of said sheet bars.

* * * * *